Figure 1:
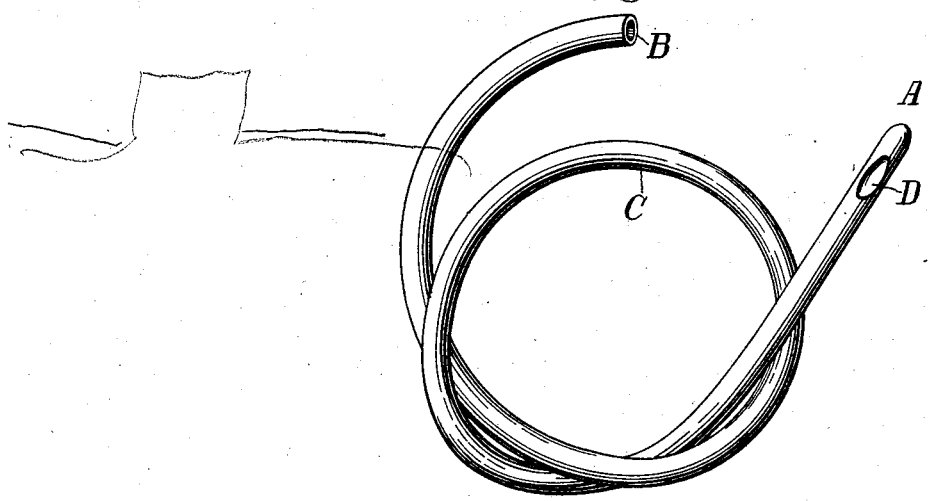

No. 721,768. PATENTED MAR. 3, 1903.
B. G. WORK.
PROCESS OF MAKING INDIA RUBBER SURGICAL INSTRUMENTS.
APPLICATION FILED APR. 10, 1902.
NO MODEL.

Witnesses
Edgeworth Bruns
Oliver Williams

Inventor
Bertram G. Work
By his Attorney
Edward Davis

UNITED STATES PATENT OFFICE.

BERTRAM G. WORK, OF AKRON, OHIO, ASSIGNOR TO THE B. F. GOODRICH COMPANY, OF AKRON, OHIO, A CORPORATION OF OHIO.

PROCESS OF MAKING INDIA-RUBBER SURGICAL INSTRUMENTS.

SPECIFICATION forming part of Letters Patent No. 721,768, dated March 3, 1903.

Application filed April 10, 1902. Serial No. 102,261. (No specimens.)

*To all whom it may concern:*

Be it known that I, BERTRAM G. WORK, a citizen of the United States, and a resident of the city of Akron, county of Summit, and State of Ohio, have invented certain new and useful Improvements in Processes of Making India-Rubber Surgical Instruments, of which the following is a specification.

India-rubber surgical instruments, such as tubes for washing out or drainage of cavities in the body, are formed of tubing having the end to be inserted closed and at a short distance above such closed end an inlet or eye formed for the outlet or admission of the fluid to be injected or drawn off. The interior space between the distal end of this eye and the closed end of the tube forms a pocket in which foreign matter may collect. As this pocket is difficult to cleanse thoroughly, it is objectionable. In the manufacture of these instruments, particularly catheters, it has been the practice to close such pocket. The methods of closing heretofore employed have resulted in the production of an instrument having its closed end solid. As compared with the hollow end this solid end is hard and unyielding. In the manufacture of catheters of rubber the end beyond the eye is made solid with rubber of the same quality of which the body of the instrument is made—that is, of rubber mixed with such ingredients as may be necessary to render it suitable for vulcanization. The vulcanization of the instrument is necessary, as non-vulcanized rubber becomes hard at 32° Fahrenheit and soft and sticky at over 82° Fahrenheit. The mixture of such ingredients as are necessary for vulcanization decreases the elasticity of the rubber and increases its hardness, and the process of vulcanization still further increases the incompressibility and hardness of the rubber. While the rubber catheter after vulcanization is elastic, yet instruments thus made lack softness and flexibility of the tip or rounded end—that is, the solid end beyond the eye is comparatively hard. The hardness of this point is objectionable, as it causes suffering to the patient, particularly in the treatment of hypertrophy of the prostate and dilation of the bladder. For this reason the catheter with hollow end is still used to a considerable extent in catheterization, though the use of the hollow-end catheter is recognized in the medical profession as a source of danger, it being virtually impossible to cleanse the hollow end thoroughly without injury or destroying the instrument in that putrifying substances may be introduced into the bladder, producing suppurative cystitis.

To retain the advantages of flexibility and softness of the hollow end and at the same time to avoid its concomitant dangers of infection, I have devised an improved method of filling the hollow end, which consists in closing the end prior to the vulcanization of the instrument with pure rubber, gum, or similar substance which is extremely soft and elastic and is unaffected by vulcanization and which in turn may be covered with or inclosed in rubber similar to that composing the remainder of the tube—that is, rubber suitable for vulcanization. The instrument so made has a solid end; but the point so formed is readily flexed and compressed and is so soft and supple as to cause a minimum of pain to the patient, as it readily passes an obstruction and by reason of its elasticity again resumes its shape.

The drawings accompanying this specification illustrate my improvement as applied to one form of surgical instrument to which it is especially adapted—that is, to catheters—like reference - letters indicating corresponding parts.

Figure 2:
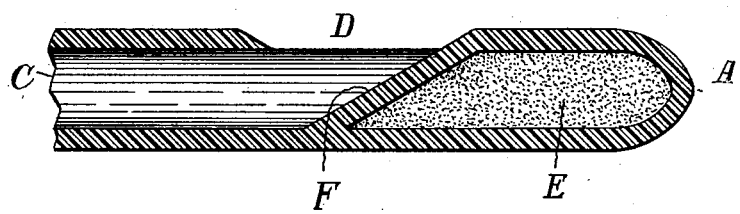
Figure 3:
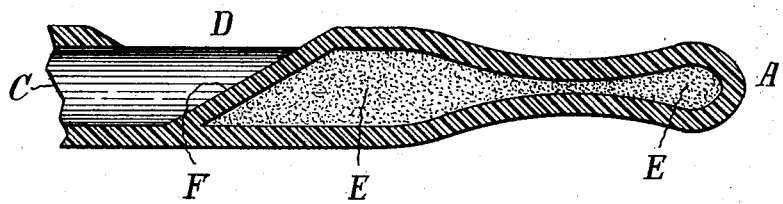

Figure 1 shows a flexible catheter. Fig. 2 shows the rounded end of a catheter in section at right angles to the plane of the eye, enlarged. Fig. 3 shows an olive-catheter in section, similarly enlarged.

A is the rounded end; B, the open end; C, the tubular body; D, the eye; E, the filling, of pure rubber or similar material.

F is the catheter-walls, extended to unite with the back of the tube proper and forming the sloping dam from the lower end of the eye upward to the back of the tube inclosing the filling in the end A.

In practicing my invention I form the instrument in the desired shape from soft rubber with which has been mixed the necessary ingredients to render it vulcanizable by any of the usual methods, as by molding. I then fill the pocket at the closed end up to the eye with pure gum. I prefer to coat this filling with soft rubber, such as that of which the body of the tube is formed, in order to protect it from foreign contact. The instrument so formed is then vulcanized. If the instrument to be made is a probe, I fill the tube first formed with rubber-gum throughout its length, preferably closing the ends with the vulcanizable rubber of the tube, and then vulcanize the instrument. The process of vulcanization does not affect the quality of elasticity or the degree of softness of the crude gum forming the kernel or core of this instrument, merely serving to unite the inclosing sheath and the inclosed kernel or core, so that they become integral.

The principle of my invention is applicable to all surgical instruments in which a soft resilient end is desirable in preference to a rigid end, as in throat or stomach tubes probes, bougies, pessaries, and drainage-tubes; also to those surgical instruments in which an elastic and compressible body is desired.

Having thus described my invention, what I claim is—

1. In the manufacture of flexible surgical instruments of rubber, the process of forming a body of vulcanizable rubber, of including therein a core of non-vulcanizable rubber and of vulcanizing the instrument so formed substantially as described.

2. In the manufacture of elastic catheters, the method of forming the end beyond the eye solid, consisting in filling the hollow below the eye with pure rubber, inclosing this filling with a vulcanizable coating and vulcanizing the catheter so formed substantially as described.

BERTRAM G. WORK.

Witnesses:
JOSEPH W. KELLEY,
HARRY A. BAUMAN.